US006217775B1

(12) United States Patent
Conca et al.

(10) Patent No.: US 6,217,775 B1
(45) Date of Patent: Apr. 17, 2001

(54) TREATMENT OF METAL-CONTAMINATED LEACHATES UTILIZING FISH BONES AND FISH HARD PARTS

(76) Inventors: James L. Conca; Judith Wright, both of 2142 Hoxie Ave., Richland, WA (US) 99352

( * ) Notice: Subject to any disclaimer, the term of this patent is extended or adjusted under 35 U.S.C. 154(b) by 0 days.

(21) Appl. No.: 09/045,188

(22) Filed: Mar. 20, 1998

(51) Int. Cl.[7] .................................................. C02F 1/62

(52) U.S. Cl. ......................... 210/688; 210/747; 210/912; 588/1; 588/20

(58) Field of Search .................................... 210/910, 913, 210/914, 747, 679, 682, 688; 405/264; 71/19; 588/1, 2, 13, 16, 20

(56) References Cited

U.S. PATENT DOCUMENTS

| 897,695 | * | 9/1908 | Young ....................................... 71/15 |
| 5,162,600 | * | 11/1992 | Cody et al. .......................... 588/236 |
| 5,193,936 | | 3/1993 | Pal et al. . |
| 5,272,992 | * | 12/1993 | Barbour et al. ...................... 111/120 |
| 5,512,702 | | 4/1996 | Ryan et al. . |
| 5,527,982 | | 6/1996 | Pal et al. . |
| 5,569,155 | | 10/1996 | Pal et al. . |
| 5,681,447 | | 10/1997 | Maycock et al. . |
| 5,711,015 | | 1/1998 | Tofe . |
| 5,719,099 | | 2/1998 | Bhat . |
| 5,732,367 | | 3/1998 | Yost et al. . |
| 5,771,472 | | 6/1998 | Carpena et al. . |
| 5,797,992 | | 8/1998 | Huff . |

FOREIGN PATENT DOCUMENTS

1742216 * 6/1992 (SU) .

OTHER PUBLICATIONS

Adepoju, A.Y., P.F. Pratt, and S.V. Mattigod. 1986. "Relationship between probable dominant phosphate compound in soil and phosphorus availability to plants." *Plant and Soil*, 92:47–54.

Chen, X.–B., J.V. Wright, J.L. Conca, and L.M. Peurrung. 1997. "Evaluation of Heavy Metal Remediation Using Mineral Apatite," *Water, Air and Soil Pollution*, vol. 98, p. 57–78.

(List continued on next page.)

*Primary Examiner*—W. L. Walker
*Assistant Examiner*—Richard W. Ward
(74) *Attorney, Agent, or Firm*—Christensen O'Connor Johnson & Kindness PLLC

(57) ABSTRACT

The present invention uses fish bones and fish hard parts to remediate, clean-up, stabilize, immobilize, or otherwise treat metal-contaminated water, soil or waste of any sort. The fish bones and fish hard parts can be mixed in with soils and wastes, or emplaced as a permeable reactive barrier in a trench or excavation, or emplaced as a liner or barrier surrounding a waste form, disposal site, or contaminated site. All that is needed is intimate contact between the fish bones and fish hard parts and the contaminated waste form, soil particles, or water. In a system of, for example, soil, waste, groundwater, surface water, waste streams, or the digestive tracts of animals, the presence of fish bones and fish hard parts reduces the amount of metal that can mobilize and migrate out of the system. Fish bones and fish hard parts remove metals from waters passing through the system or originating within the system. Fish bones and fish hard parts reduce the bioavailability of metals to organisms coming into contact with the system and from water leaving the system. The fish bones and fish hard parts can be mixed with any other material, e.g., gravel, sand, clay, zeolites, soils of all types, iron filings, cement, compost, straw, or organics of all types.

12 Claims, 3 Drawing Sheets

OTHER PUBLICATIONS

Figure 1:
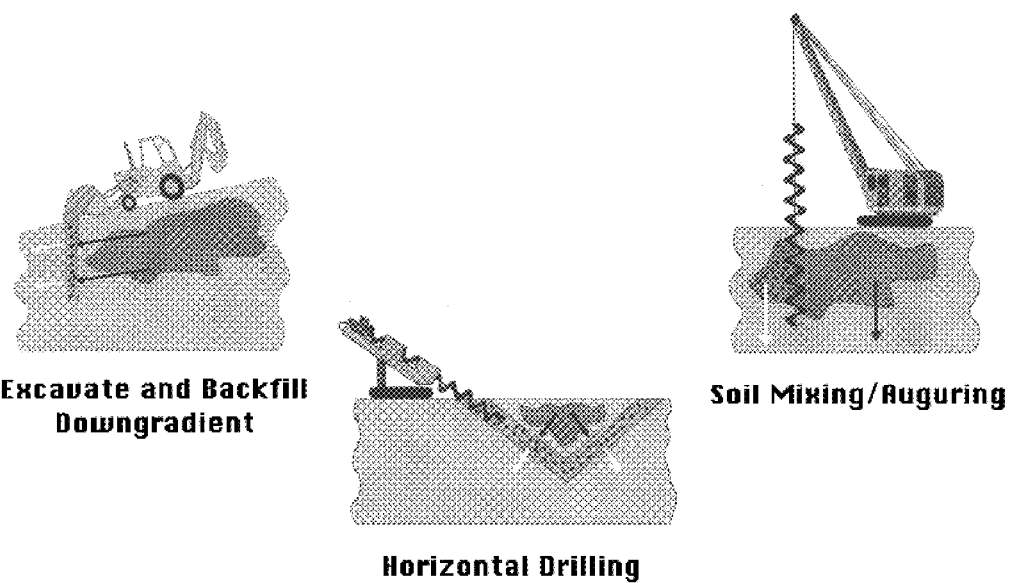

Koeppenkastrop, D. and E.J. De Carlo. 1988. "Absorption of rare earth elements from seawater onto synthetic mineral phases." *EOS Transactions of Amer: Geophysical Union*, 69:1254.

Koeppenkastrop, D. and E.J. De Carlo. 1992. "Sorption of rare earth elements from seawater onto synthetic mineral particles: an experimental approach." *Chem. Geology*, 95:251–263.

Legeros, R.Z. 1981. Apatites in biological in biological systems. *Prog. Crystal Growth Charact.*, 4:1–45.

Ma, Q.Y., S.J. Traina, T.J. Logan, and J.A. Ryan. 1993. "In situ lead immobilization by apatite." *Environ. Sci. Technol.*, 27(9):1803–1810.

McArthur, J.M. 1985. "Francolite geochemistry—compositional controls on formation, diagenesis, etamorphism, and weathering." *Geoch. Cosmoch. Acta.*, 49:23–35.

McArthur, J.M., A.R. Sahami, M. Thirwall, P.J. Hamilton, and A.O. Osborn. 1990. "Dating phosphogenesis with Sr isotopes." *Geoch. Cosmoch. Acta.*, 54:1343–1352.

Nriagu, J.O. "Formation and stability of base metal phosphates in soils and sediments." 1984. *Phosphate Minerals*. Nriagu, J. and Moore, P. (eds.) Springer–Verlag, Berlin, , p. 318–329.

Ruby, M.V., A. Davis, and A. Nicholson. 1994. "In situ formation of lead phosphates in soils as a method to immobilize lead." *Environmental Science and Technology*, 28:646–654.

Skinner, H.C.W. 1987. "Bone: mineral and mineralization." *The Scientific Basis of Orthopaedics*, ed., J.A. Albright and R. Brand, Appleton and Lange, Norfolk, CT.

Skinner, H.C.W. 1989. "Low temperature carbonate phosphate materials or the carbonate–apatite problem." *Origin, Evolution and ModeM Aspects of Biomineralization in Plants and Animals,*, ed. Rex Crick. Proceedings of the $5^{th}$ International Symposium on Biomineralization, Arlington, TX, Plenum Press, NY.

Skinner, H.C.W. and C.W. Burnham. 1968. "Hydroxyapatite," Annual Report of the Director, Geophysical Laboratory, Carnegie Inst., Washington, D.C.

Stanforth, R. and A. Chowdhury. 1994. "In situ stabilization of led–contaminated soil." Federal Environmental Restoration III and Waste Minimization II Conference Proceedings, New Orleans.

Wright, Judith. 1990a. "Conodont apatite: structure and geochemistry," P. 445–459. Metazoan Biomireralization: Patterns, Processes and Evolutionary Trends, ed. Joseph Carter. $28^{th}$ International Geological Congress, Paleontological and Society and American Geophysical Union. Washington, D.C.

Wright, Judith. 1990b. Conodont geochemistry, a Key to the Paleozoic, p.277–305. $1^{st}$ International Senckenberg Conference and $5^{th}$ European Conodont Symposium (ECOS V) Contributions III., ed. Willi Ziegler. Courier Forschungsinstitut Senckenberg, Frankfurt, Germany.

Wright, Judith, James F. Miller, and William T. Holser.. 1987a. Chemostratigraphy of conodonts across the Cambrian–Ordovician Boundary: western United States and southeast China, p. 259–286. *Conodonts: Investigative Techniques and Applications*, ed. Ronald L. Austin, Ellis Horwood, Ltd., London.

Wright, Judith, H. Schrader, and W. T. Holser. 1987b. "Paleoredox variations in ancient oceans recorded by rare earth elements in fossil apatite." *Geoch. Cosmoch. Acta.*, 51:631–644.

Wright, J., J. Conca, J. Repetski,. and J. Clark. 1990. "Geochemistry and microstructure of conodonts from Jilin Province, China." $1^{st}$ International Senckenberg Conference and European Conodont Symposium Contributions III. Courier Forschungsinstitut Senckenberg, Frankfurt, Germany, 118:307–332.

Xu, Y. and F.W. Schartz. 1994. "Lead immobilization by hydroxyapatite in aqueous solutions." *J. Contaminant Hydrology*, 15:187–206.

* cited by examiner

Excavate and Backfill Downgradient

Horizontal Drilling

Soil Mixing/Auguring

TREATMENT OF METAL-CONTAMINATED LEACHATES UTILIZING FISH BONES AND FISH HARD PARTS

BACKGROUND—FIELD OF INVENTION

This invention relates to the clean-up, stabilization, or treatment of soils, water, and waste forms contaminated with metals such as lead, cadmium, uranium, and zinc, for the purpose of reducing the amount of metals that are leachable or that can subsequently migrate into the environment or be available to biological organisms.

BACKGROUND—DISCUSSION OF PRIOR ART

Metals readily leach from contaminated soils, sediments, rocks, waste piles, trenches, pits, and contained bodies of water. These leachates serve as sources of metal contamination to the environment, especially adjacent streams and underlying groundwater zones. Efforts to mobilize and remove metals from the subsurface to below regulatory limits have not been successful because of the various intermediate solubilities and sorption properties that each metal and suite of metals exhibit under most environmental conditions.

Alternately, metals can be stabilized in place to prevent them from migrating or leaching into groundwater. Many chemical additives have been studied to immobilize metals in these situations, e.g., lime, phosphate rock, carbonate rock, fly ash, clay minerals, zeolites, and sulfur and iron compounds. The additives can be mixed in with the soil or waste, emplaced as a permeable reactive barrier in a trench to treat groundwater moving through the trench, or emplaced as liners around a waste form or a contaminated site to treat any leachate leaving the site or waste form. Other studies have focused on pretreatment to remove metals before disposal of waste or contaminated soils. Others have used encapsulation to prevent subsequent leaching, e.g., cementing contaminated waste or soil. All have met with various degrees of success under various conditions. None have been satisfactory from the perspectives of performance, widespread applicability to many conditions, and cost.

The groundwork for this field of science has been laid by previous studies in widely divergent disciplines, including 1) phosphate mineralogy and crystal chemistry (LeGeros, 1981; Nriagu, 1984; Skinner, 1987, 1989; Skinner and Burnharn, 1968; Wright, 1990a,b; Wright et al., 1990); 2) scavenging and sequestration of minor and trace elements, such as uranium, metals, and the rare earth elements, in natural phosphate deposits (McArthur et al., 1990); 3) remediation studies of lead systems (Ma et al., 1993; Ruby et al., 1994; Xu and Schwartz, 1994; Stanforth and Chowdhury, 1994; Chen et al., 1997); 4) the impact and accessibility of phosphorus fertilizers to crops (Adepoju et al., 1986); 5) natural analogues in metallic mineral deposits (Koeppenkastrop and DeCarlo, 1988, 1992); 6) phosphate diagenesis during the formation and evolution of phosphorite deposits (McArthur, 1985) and 7) the evidence of changes in the paleochemical evolution of oceans, atmospheres, and climates evidenced by metals, lanthanides, and actinides incorporated into fossil material (Wright et al., 1987a,b and 1990a,b).

Geochemists have long known that metal phosphate compounds are generally less soluble and more stable than other metal compounds. Methods have been studied that use inorganic phosphates added to contaminated soils, water or wastes in order to stabilize the metals in phosphate compounds. The phosphate can be in many forms including phosphate minerals such as apatite, calcium orthophosphate, the inorganic constituents that form many fertilizers, phosphate glass, or dissolved phosphate salts in water. Cody et al., U.S. Pat. No. 5,162,600, discloses a method of using inorganic phosphate to stabilize lead, but the inorganic phosphate compounds are less effective than biogenic phosphates and the patent referred only to treatment of lead-contaminated soils.

Additives can act in several ways. The additive often provides ions to solution that can sometimes combine with metals in solution to form new metal-containing solids that can precipitate. In addition, an additive can buffer the pH or other aspect of the chemistry to a degree that makes leaching of metals less likely or induces the precipitation of metals into a new solid, or induces adsorption of the metal onto an existing solid surface. The additive can sometimes adsorb metals onto its own surface. Some metals can also sometimes replace or exchange for other metals in the structure of the additive. All of these possible actions depend upon the chemistry and conditions of the situation and depend upon the additive used. The additive usually treats the leachate or metals in solution as they leave the contaminated material and encounter the additive, either as a solid or in solution. The additive is not actually treating the contaminated solid. Therefore, the leaching solution containing the metals must come into intimate contact with the additive in order to be treated. Therefore, the emplacement strategy depends upon many factors in each situation.

The performance of a phosphate additive depends upon the specific chemistry of the additive, e.g., whether it is phosphate made of calcium hydroxyapatite or phosphate rock made of calcium fluorapatite. Each has different properties with respect to metal immobilization and treatment. Also, apatite minerals can be carbonated or chlorinated to varying degrees which greatly alters the performance with respect to metal immobilization. Additionally, different phosphate sources have different starting concentrations of metals already in their structure, e.g., phosphate rock usually has high levels of strontium and barium which makes it less useful for metal treatment. Also, the initial porosity of the phosphate material, i.e., the amount of pore space in the solid and the resultant surface area available for reaction, is different for different phosphate sources. In fact, there are over 300 apatite minerals alone with different compositions, different properties and different reactivities. Only a few are ideal for metal immobilization and treatment. Previous common sources of phosphate for additives include phosphate rock, phosphate fertilizers, bone char from cows, and reagent grade phosphate chemicals such as calcium orthophosphate. However, these inorganic sources are not adequate for many applications, often exhibit low reactivities, and are either costly or not available in enough quantities for large field operations.

OBJECTS AND ADVANTAGES

Accordingly, this patent fulfills the need to find an inexpensive, highly reactive phosphate material that is available in large quantities for the purpose of metal remediation and stabilization in soils, water and waste forms. This material is fish bones and fish hard parts. Fish bones and fish hard parts include all bones, scales, connective tissue and materials composed primarily of phosphatic compounds. As opposed to inorganic phosphate compounds, fish bones and fish hard parts are highly reactive with respect to most metals and contaminated water under many environmental and waste conditions, and can be applied in many different ways to soil, water and waste forms to treat or stabilize metals in order to prevent or reduce subsequent leaching of metals out of the system. Because of the stabilization conferred by the presence of fish bones and fish hard parts in the system, the bioavailability of metals is also greatly reduced, e.g., ingestion by birds of metal-contaminated soil is less toxic if the soil has been mixed with fish bones and fish hard parts. The degree of bioavailability depends upon the species and the conditions, but bioavailability of metals is lessened by the presence of fish bones and fish hard parts, or by the previous treatment of the soil or water or waste by fish bones and fish hard parts.

The fish bones and fish hard parts always have various amounts of organics still associated with them, and the presence of organics in the fish bones and fish hard parts makes them different from all other apatite formulations. The presence of organics on the fish bones and fish hard parts confers advantages in many situations where organics are desirable, e.g., situations involving revegetation, or situations requiring reduced compounds. The amount of organics can be chosen ahead of time by the amount of processing or steam cleaning of the fish bones and fish hard parts, and can be tailored to various situations. Most commonly, fish bones and fish hard parts are available from fish processing plants from which much of the protein and organics have been removed. The fish bones and fish hard parts are leftover products used as fertilizers or as fillers in various foodstuffs such as cat food. Often fish bones and fish hard parts are disposed of as a waste product, especially from offshore fishing vessels that simply dump the debris overboard.

The main advantages of fish bones and fish hard parts over other sources of phosphate are that fish bones and fish hard parts are fully carbonated, contain little fluorine and almost no metals, and are highly porous with a high surface area for reactions. All of these make fish bones and fish hard parts ideal for use in treating and immobilizing metals in soils, water and waste forms. The fish bones and fish hard parts can be mixed in with soils or wastes; or emplaced as a liner or barrier surrounding a waste form, disposal site, or contaminated site; or emplaced as a permeable reactive barrier in a trench or excavation (FIG. 1). All that is needed is intimate contact between the fish bones and fish hard parts and the contaminated solution coming out of the waste form, soil particles or contaminated site. We have investigated all of these modes of usage of fish bones and fish hard parts with respect to zinc, cadmium, lead, and copper and they have all been successful in reducing the metal concentrations in solution. Fish bones and fish hard parts are a commodity that is available in large amounts, are relatively inexpensive, and can be easily transported by truck or rail to the final destination. Fish bones and fish hard parts contain no hazardous components. All metals are effected to some degree, but the metals most effectively stabilized by fish bones and hard parts are lead, zinc, copper, cadmium, nickel, uranium, barium, cesium, strontium, plutonium, thorium, and most other lanthanides and actinides. Fish bones and fish hard parts are also an extremely good pH buffer, especially for acidic waters that usually occur in acidic mine drainage. The presence of fish bones and fish hard parts in the system will buffer the pH of most water within the system back to the normal pH range of 6 to 8. Further objects and advantages of this method will become apparent from a consideration of the ensuing description.

SUMMARY

The present invention uses fish bones and fish hard parts to remediate, clean-up, stabilize, immobilize, or otherwise treat metal-contaminated water, soil or waste of any sort. The fish bones and fish hard parts can be mixed in with soils and wastes; or emplaced as a slurry or colloidal suspension; or emplaced as a permeable reactive barrier in a trench or excavation; or emplaced as a liner or barrier surrounding a waste form, disposal site, or contaminated site; or placed into a tank or any container so that contaminated water can flow-through it. Although this method does not depend upon the mode of emplacement, specific emplacement strategies tailored to each situation will optimize the performance and advantages of this method, e.g., mixing or augering into soil to treat metal-contaminated soil, but backfilled into a trench to treat metal-contaminated groundwater that flows through it. All that is needed is intimate contact between the fish bones and fish hard parts and the contaminated waste form, soil particles, water or other component of the system containing the metal contamination. Whatever the system, either soil, groundwater, surface water, waste, shot, particulates, bricks, waste streams, or the digestive tracts of animals, the presence of fish bones and fish hard parts in the system reduces the amount of metal that can mobilize and migrate out of the system, and removes metals from waters passing through the system or originating within the system, and reduces the bioavailability of metals to organisms coming into contact with the system or water leaving the system. The pH of acidic waters is also greatly buffered back to the normal pH range of 6 to 8 by the presence of fish bones and fish hard parts.

DESCRIPTION OF INVENTION

This present invention is the method of using fish bones and fish hard parts to remediate, clean-up, stabilize, immobilize, or otherwise treat metal-contaminated water, soil or waste of any sort. The fish bones and fish hard parts can be mixed in with soils or wastes; or emplaced as a liner or barrier surrounding a waste form, disposal site, or contaminated site; emplaced as a slurry or colloidal suspension; or placed into a tank or any container so that contaminated water can flow-through it; or emplaced as a permeable reactive barrier in a trench or excavation. All that is needed is intimate contact between the fish bones and fish hard parts and the contaminated solution coming out of the waste form, soil particles or contaminated site. The fish bones and fish hard parts can be cleaned of organics or can be in their natural state in whole or in part. The fish bones and fish hard parts can be ground or sieved to any size, but will perform at any size and in any form. The fish bones and fish hard parts can be mixed with any other material, e.g., gravel, sand, clay, zeolites, soils of all types, iron filings, cement, compost, straw, or organics of all types.

Although there are many other modes of emplacement not discussed here, FIG. 1 gives three examples of emplacement strategies for using fish bones and hard parts to remediate metal-contaminated soil, water or waste. Fish bones and fish hard parts can be used to fill a trench or excavation that treats water flowing through it. Fish bones and fish hard parts can be mixed into soil or waste or other materials to treat any water that may enter or leave the system. Fish bones and fish hard parts can be emplaced as a liner or barrier beneath or around a system to treat water that may leave the system.

The fish bones and fish hard parts act in several ways. The fish bones and fish hard parts provide phosphate ions to solution that can combine with metals in solution to form new metal-phosphate solids that can precipitate. In addition, fish bones and fish hard parts buffer the pH and other aspects of the water chemistry to a degree that makes leaching of metals less likely and induces the precipitation of metals into new solids, or induces adsorption of the metal onto existing solid surfaces. The fish bones and fish hard parts can adsorb metals onto their own surfaces. Some metals can also replace or exchange for other metals in the structure of the fish bones and hard parts. The fish bones and hard parts actually treat the leachate or metals in solution as they leave the contaminated material and encounter the fish bones and fish hard parts. The fish bones and fish hard parts are not actually reacting with the contaminated solid. Therefore, the leaching solution containing the metals must come into intimate contact with the fish bones and fish hard parts in order to be treated. Each situation must be studied independently to decide how to emplace the fish bones and fish hard parts. The fish bones and fish hard parts will reduce the metal concentration in solution, will immobilize the metals, or will otherwise treat the system, until the capacity of the fish bones and fish hard parts is reached and a maximum amount of metal is stabilized. The time period over which this occurs depends upon the conditions, water chemistry, total metal inventory and amount of fish bones and fish hard parts present. The amount of fish bones and fish hard parts used in any particular situation must be decided for that situation, with a particular time-frame in mind, and with knowledge of any relevent regulations, community concerns and other factors involved at that site. Usually a feasibility study or other laboratory experiments are performed with site-specific materials and water with the fish bones and fish hard parts to determine the important factors involved at a particular site and the emplacement strategy to be used.

EXAMPLE

Figure 2:
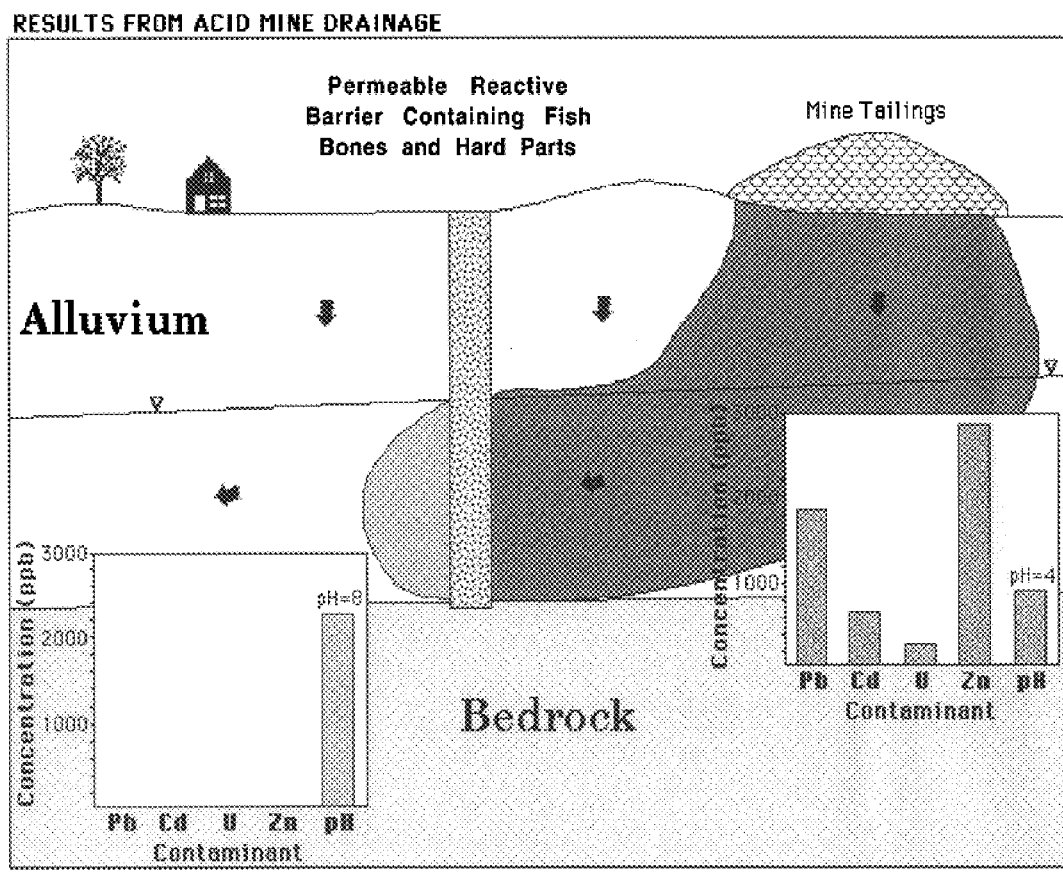

FIG. 2 illustrates the use of fish bones and fish hard parts to treat groundwater contaminated from mining operations and waste, in this case emplaced as a permeable reactive barrier in a trench. Metals are removed from the contaminated water passing through the fish bones and fish hard parts. The pH of the water is also adjusted back into the normal range.

This emplacement strategy was investigated in laboratory feasibility studies for metal-contaminated groundwater issuing from seeps beneath a mine waste tailings pile from mining operations in Northern Idaho. Several materials were investigated as additives for a permeable reactive barrier downgradient of the pile that would trap and treat the contaminated seep water as in FIG. 2. Materials included three samples of different fish bones and fish hard parts, designated as Fish AP, Fish WE, and Fish PR, iron filings, cow bone, phosphate rock, compost, the two zeolite minerals chabazite and clinoptilolite, and Cabsorb®. The latter four materials are marketed to treat and clean-up acid mine drainage of this type.

The analyses of the seep waters were:

| Seep Water | Zn | Pb | Cd | Cu |
| --- | --- | --- | --- | --- |
| P4 pH 4.57 | 155 ppm | 6.9 ppm | 0.78 ppm | 64 ppm |
| P7 pH 4.21 | 134 ppm | 2.5 ppm | 0.87 ppm | 22 ppm |

We performed column flow-through tests using these seep waters and columns filled with each material that were geometrically similar to the field situation as illustrated in FIG. 2. Each material had a similar grain size. The effluent solutions exiting the columns were monitored and analyzed for each metal. In column experiments the metal concentrations in the effluent exiting the column, C, is divided by metal concentrations in the influent entering the column, $C_0$, to give an indication of performance, $C/C_0$. When $C/C_0$ exceeds 0.5, then breakthrough of the metal is considered to have occured. When $C/C_0$ appoaches 1, then the barrier material has reached its capacity for that metal and will no longer significantly remove that metal from the water.

Figure 3:
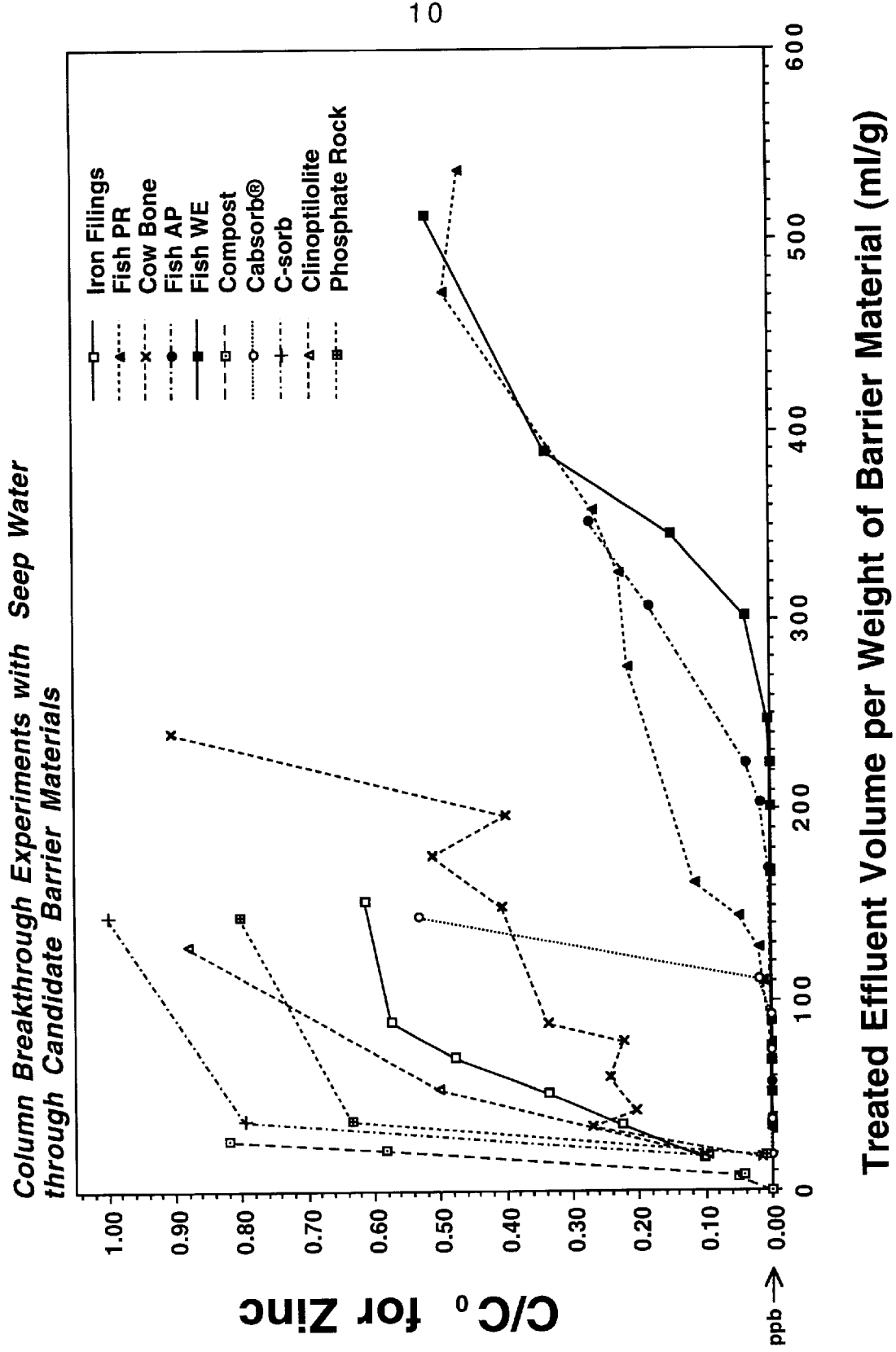

FIG. 3 shows $C/C_0$ for zinc plotted against the amount of water flowing through each columns. It can be seen that the fish bones and fish hard parts performed much better than all other materials, including the inorganic phosphate rock and the cow bone. Similar results have been obtained for other metals. Fish bones and fish hard parts perform better and completely differently than all other materials and all other forms of bone and inorganic phosphate.

We claim:

1. A method for treating leachates from a soil or waste site contaminated with metals comprising the steps of:

providing leftover fish bones and fish hard parts having amounts of organics associated therewith;

emplacing said leftover fish bones and fish hard parts having amounts of organics associated therewith within an excavation located adjacent to said metal contaminated site, wherein said excavation is positioned such that said leftover fish bones and fish hard parts having amounts of organics associated therewith contact metal-containing leachates flowing from said metal contaminated site;

contacting said metal-containing leachates with said leftover fish bones and fish hard parts having amounts of organics associated therewith within said excavation;

forming reaction products from said leachate metals and said leftover fish bones and fish hard parts having amounts of organics associated therewith; and immobilizing said metals in said reaction products.

2. The method of claim 1 wherein the step of forming reaction products is one or more reaction mechanisms selected from the group consisting of precipitation, adsorption and cationic exchange.

3. The method of claim 1 wherein said metal comprises any lanthanide.

4. The method of claim 1 wherein said metal comprises any actinide.

5. The method of claim 1 wherein said metal includes one or more metals selected from the group consisting of lead, zinc, copper, cadmium, nickel, uranium, barium, cesium, strontium, plutonium, and thorium.

6. The method of claim 1, wherein said leftover fish bones and fish hard parts having amounts of organics associated therewith are ground up.

7. The method of claim 1, further comprising the step of backfilling said excavation.

8. The method of claim 1, wherein said excavation is made by horizontal drilling.

9. The method of claim 1, wherein said amount of organics is adjusted by steam cleaning.

10. The method of claim 1 further comprising the step of mixing said leftover fish bones and fish hard parts having amounts of organics associated therewith with one or more matrix materials selected from the group consisting of gravel, sand, clay, zeolites, soil, iron filings, cement, compost, straw, and organics.

11. The method of claim 10, wherein said matrix material is soil.

12. The method of claim 10, wherein said matrix material is iron filings.

* * * * *